(12) United States Patent
Chae et al.

(10) Patent No.: US 12,430,648 B2
(45) Date of Patent: Sep. 30, 2025

(54) CLUSTERING METHOD AND SYSTEM FOR DETECTING ABNORMAL TRANSACTION IN E-COMMERCE

(71) Applicant: S2W INC., Seongnam-si (KR)

(72) Inventors: So Young Chae, Yongin-si (KR); In Wook Hwang, Seongnam-si (KR); Ki Cheol Kim, Seongnam-si (KR)

(73) Assignee: S2W INC., Seongnam-si (KR)

( * ) Notice: Subject to any disclaimer, the term of this patent is extended or adjusted under 35 U.S.C. 154(b) by 0 days.

(21) Appl. No.: 17/870,140

(22) Filed: Jul. 21, 2022

(65) Prior Publication Data

US 2023/0027870 A1    Jan. 26, 2023

(30) Foreign Application Priority Data

Jul. 23, 2021 (KR) .......................... 10-2021-0096771

(51) Int. Cl.
*G06Q 20/40* (2012.01)
*G06Q 30/018* (2023.01)
*G06Q 30/06* (2023.01)

(52) U.S. Cl.
CPC ..... *G06Q 20/4016* (2013.01); *G06Q 30/0185* (2013.01)

(58) Field of Classification Search
None
See application file for complete search history.

(56) References Cited

U.S. PATENT DOCUMENTS

| | | | | |
|---|---|---|---|---|
| 11,704,673 | B1 * | 7/2023 | Drapeau | G06N 20/00 |
| | | | | 705/72 |
| 2008/0065694 | A1 * | 3/2008 | Qian | G06F 16/9537 |
| 2008/0222002 | A1 * | 9/2008 | Hu | G07G 3/003 |
| | | | | 705/38 |
| 2019/0295089 | A1 * | 9/2019 | Jia | G06N 20/00 |
| 2020/0169603 | A1 * | 5/2020 | Badawy | H04L 63/104 |

FOREIGN PATENT DOCUMENTS

| | | |
|---|---|---|
| JP | 2005-11049 A | 1/2005 |
| KR | 10-2016-0064710 A | 6/2016 |
| KR | 10-1834260 B1 | 3/2018 |

OTHER PUBLICATIONS

Office Action issued Feb. 14, 2023 in Korean Application No. 10-2021-0096771.

* cited by examiner

*Primary Examiner* — Joseph W. King
(74) *Attorney, Agent, or Firm* — Sughrue Mion, PLLC

(57) ABSTRACT

The present invention relates to a method and system for tracking abnormal transactions in e-commerce, and an object of the present invention is to track abnormal transactions by analyzing complex characteristic data of product information uploaded to an e-commerce platform. In order to achieve this object, a method for detecting an abnormal transaction in an electronic device according to the present invention includes: step a of generating an identity map based on first transaction information previously stored in an e-commerce server; step b of collecting second transaction information newly uploaded to the e-commerce server; step c of extracting a first identifier and second identifiers included in the second transaction information and generating a third identifier by combining the plurality of second identifiers; and step d of determining whether the second transaction information is an abnormal transaction by searching the identity map for the first identifier and the third identifier.

11 Claims, 4 Drawing Sheets

CLUSTERING METHOD AND SYSTEM FOR DETECTING ABNORMAL TRANSACTION IN E-COMMERCE

BACKGROUND OF THE INVENTION

Field of the Invention

The present invention relates a method and system for detecting abnormal transaction in e-commerce, and more particularly, to a method and system for detecting an abnormal transaction, which detect a user who conducts an abnormal transaction, such as fraud or illegal product sales.

Description of the Related Art

Recently, with the development of Internet infrastructure, e-commerce has been activated, and a number of platforms for selling items (second-hand items) used by users to other users have appeared. These second-hand item trading platforms include DangGeun Market, JoongGo-Nara, or the like. However, since the number of victims of abnormal transactions such as fraud is increasing due to the nature of second-hand transactions in trading second-hand items, a technology for identifying users performing abnormal transactions such as fraud is required.

SUMMARY OF THE INVENTION

An object of the present invention is to solve the problems described above, and is to track abnormal transactions by generating and analyzing an identity graph based on information on transactions already performed in an e-commerce platform and user information of the corresponding transactions.

Another object of the present invention is to prevent occurrence of abnormal transactions by grouping abnormal users who have performed abnormal transactions through the identity graph and monitoring abnormal users.

In order to achieve above objects, according to an aspect of the present invention, a method for detecting an abnormal transaction in an electronic device includes: step a of generating an identity map based on a first transaction information previously stored in an e-commerce server; step b of collecting a second transaction information newly uploaded to the e-commerce server; step c of extracting a first identifier and a plurality of second identifiers included in the second transaction information and generating a third identifier by combining the plurality of second identifiers; and step d of determining whether the second transaction information is an abnormal transaction by searching the identity map for the first identifier and the third identifier.

According to an aspect of the present invention, a device for detecting abnormal transaction comprises: a map generation module configured to generate an identity map based on a first transaction information pre-stored in an e-commerce server; a transaction information collection module configured to collect a second transaction information newly uploaded to the e-commerce server; and a transaction information analysis module configured to extract a first identifier and second identifiers included in the second transaction information, generate a third identifier by combining a plurality of second identifiers, search the identity map for the first identifier and the third identifier, and determine whether the second transaction information is an abnormal transaction.

DETAILED DESCRIPTION OF THE PREFERRED EMBODIMENTS

Figure 1:
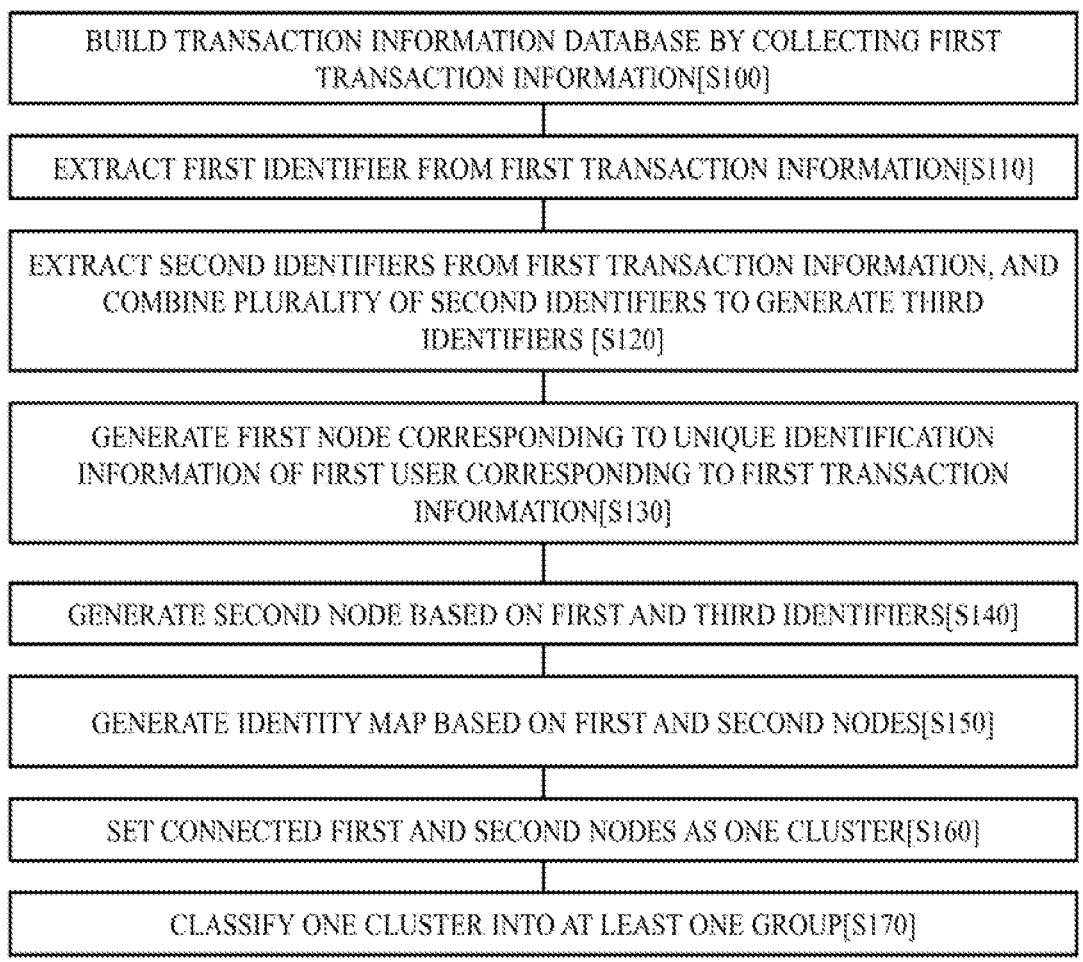
FIG. 1 is a flowchart for describing a method of constructing an identity map used in an abnormal transaction detecting method according to an embodiment of the present invention.

The above-described objects, features, and advantages will be described in detail below with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. It should be noted that reference to the singular includes the plural unless the context clearly dictates otherwise and reference to the singular form is also understood to imply the inclusion of plural forms.

The terminology used herein is for the purpose of describing specific exemplary embodiments only and is not intended to limit the present invention. As used herein, the singular forms "a", "an" and "the" are intended to include the plural forms as well, unless the context clearly indicates otherwise. The term "and/or" includes all combinations and any one of items listed in connection therewith. The terms "comprise", "comprising", "including", "having" and the like have inclusive meanings, and accordingly, these terms specify features, integers, steps, operations, elements, and/or components, and does not exclude the presence or addition of one or more other features, integers, steps, operations, elements, components, and/or groups thereof. The steps, processes, and operations of the method described herein are not to be construed as necessarily requiring their performance in the particular order discussed or illustrated, unless specifically identified as an order of performance. It is also to be understood that additional or alternative steps may be employed.

In addition, each component may be implemented as a hardware processor, respectively, the above components may be integrated to be implemented as a single hardware processor, or the above components may be combined with each other to be implemented as a plurality of hardware processors.

Hereinafter, preferred embodiments of the present invention will be described in detail with reference to the accompanying drawings.

Abnormal transactions occurring in e-commerce according to an embodiment of the present invention may include fraud, illegal product sales, cross-tradings, and the like, all of which are stored as data in an e-commerce server, so the abnormal transaction tracking device can track a user (abnormal user) who performs an abnormal transaction by accessing the e-commerce server and parsing data.

Transaction information according to an embodiment of the present invention may include product information, payment information, delivery information, and user information. The product information includes a product name and a product image, the payment information includes account information and card information, the delivery information includes a delivery address and a postal code, and the user information includes seller information and buyer information, which may include a seller or buyer's name, contact information, an access device ID (identification information unique to devices), a device model, an access IP address, and location information.

The access IP address included in the user information may mean a fixed IP other than an IP address allocated by a telecommunication company and a public facility IP. Accordingly, since the access IP address included in the transaction information means an IP address used by a small number of people at home or in a company, when the IP addresses of a plurality of transaction information overlap each other, there is enough room for a seller or a buyer performing a corresponding transaction to be judged as being suspicious.

FIG. 1 is a flowchart for describing an example of constructing an identity map used in a method for detecting abnormal transactions according to an embodiment of the present invention.

In step 100, an electronic device may collect a plurality of pieces of first transaction information pre-stored in an e-commerce server to build a transaction information database.

In building the transaction information database, the electronic device may crawl a website for a first product image included in the first transaction information to further collect images related to the first product corresponding to the first product information. The electronic device may build the transaction information database by further including the collected image related to the first product as the first product image.

The first transaction information stored in the transaction information database may include a tag according to the presence or absence of an abnormal transaction. Specifically, the first transaction information previously determined to be an abnormal transaction will include an abnormal transaction tag.

The electronic device may further store, in the transaction information database, dangerous IP information on IP addresses reported or blocked as fraudulent by users of electronic commerce transactions. The electronic device may collect additional information such as the IP owner organization, country, allocated band range (Classless Inter-Domain Routing: CIDR), or the like of the reported IP address and further include the additional information in the dangerous IP information.

In step 110, the electronic device may extract at least one first identifier from the first transaction information stored in the transaction information database. The first identifier may be a device ID and payment information, which are unique data that is difficult for a user to arbitrarily modify.

In step 120, the electronic device may extract a plurality of second identifiers other than the first identifier from the first transaction information, and combine the plurality of second identifiers to generate a third identifier. The second identifier is information that a user is able to arbitrarily modify at any time. Since it is difficult to determine an abnormal user with the second identifier alone, a plurality of second identifiers are combined to be used as a basis enough to determine an abnormal user.

Specific description will be given through an example. The electronic device may generate a third identifier by combining a plurality of second identifiers, such as a postal code, address information, contact information, name, last four digits of the contact information, and the like. Although the probability of fabricating second identifier is high, since a cost is required to pick up a transaction product when a postal code and a delivery address are set far from a user's main living area, it is determined that the probability of fabrication is low and a third identifier is generated by combining other second identifiers so that it could be used as a basis for the judgment of the abnormal user.

Meanwhile, the electronic device may further set an identifier that is not defined as the third identifier among the second identifiers as a fourth identifier.

The electronic device may normalize first address information before the first address information included in the first transaction information is used as the second identifier. Since the consistency of the address information is deteriorated because either one of a road name address and a land-lot address is used depending on the user, the electronic device may convert the land-lot address into the road name address when the address information represents the land-lot address. In addition, the electronic device may remove unnecessary characters, symbols, and blanks included in a detailed address and unify the format of the detailed address through a hyphen. For example, when the detailed addresses are 101-dong 307-ho and B-dong 3-ho, the electronic device may unify the detailed addresses into 101-307 and B-3, respectively.

In step 130, the electronic device may generate a first node corresponding to the unique identification information of a first user included in the first transaction information.

In step 140, the electronic device may generate a second node based on a first identifier extracted from the first transaction information and/or a third identifier. The first node and the second node will be connected as edges. In this way, the identity map will be configured by centering a node for the user's unique identification information.

In step 150, the electronic device may generate an identity map using the first node and the second node. When the identical second node is connected to another first node, the electronic device may connect the nodes like the first node (a)—the second node—the first node (b). In this case, the electronic device may determine that the same user has used different unique identification information based on the first node (a) and the first node (b).

When generating the identity map, the electronic device may set an edge distance between the first node and the second node.

The electronic device may set the edge distance between the first node and the second node corresponding to the first identifier to 0. Accordingly, when there are a plurality of first nodes connected to the second node, the edge distance between the plurality of first nodes will be 0.

In addition, the electronic device may use a set value of a manager for the third identifier when setting the edge distance between the first node and the second node corresponding to the third identifier. The electronic device may set the edge distance between the second node corresponding to the third identifier having sufficient grounds to determine the risk level of the transaction information and the first node to 1, and set the edge distance between the second node corresponding to the fourth identifier and the first node to 2.

Furthermore, the electronic device may differentiate a first node and a second node for first transaction information including an abnormal transaction tag from a first node and a second node for first transaction information not including an abnormal transaction tag. For example, the electronic device may change the color or size of a node corresponding to the first transaction information including the abnormal transaction tag.

In step 160, the electronic device may configure all connected first and second nodes as one cluster. Accordingly, the identity map may include at least one cluster.

In step 170, the electronic device may classify the cluster into at least one group. More specifically, the electronic device may set a set of a first node and a second node corresponding to a first identifier, which belong to a cluster, as a first group, set a set of the first node and a second node corresponding to a third identifier as a second group, and set a set of the first node and a second node corresponding to a fourth identifier as a third group.

That is, the electronic device may set the second node having an edge distance of 0 from the first node to a first group, the second node having an edge distance of 1 from the first node to a second group, and the second node having an edge distance of 2 from the first node to a third group.

Figure 3:
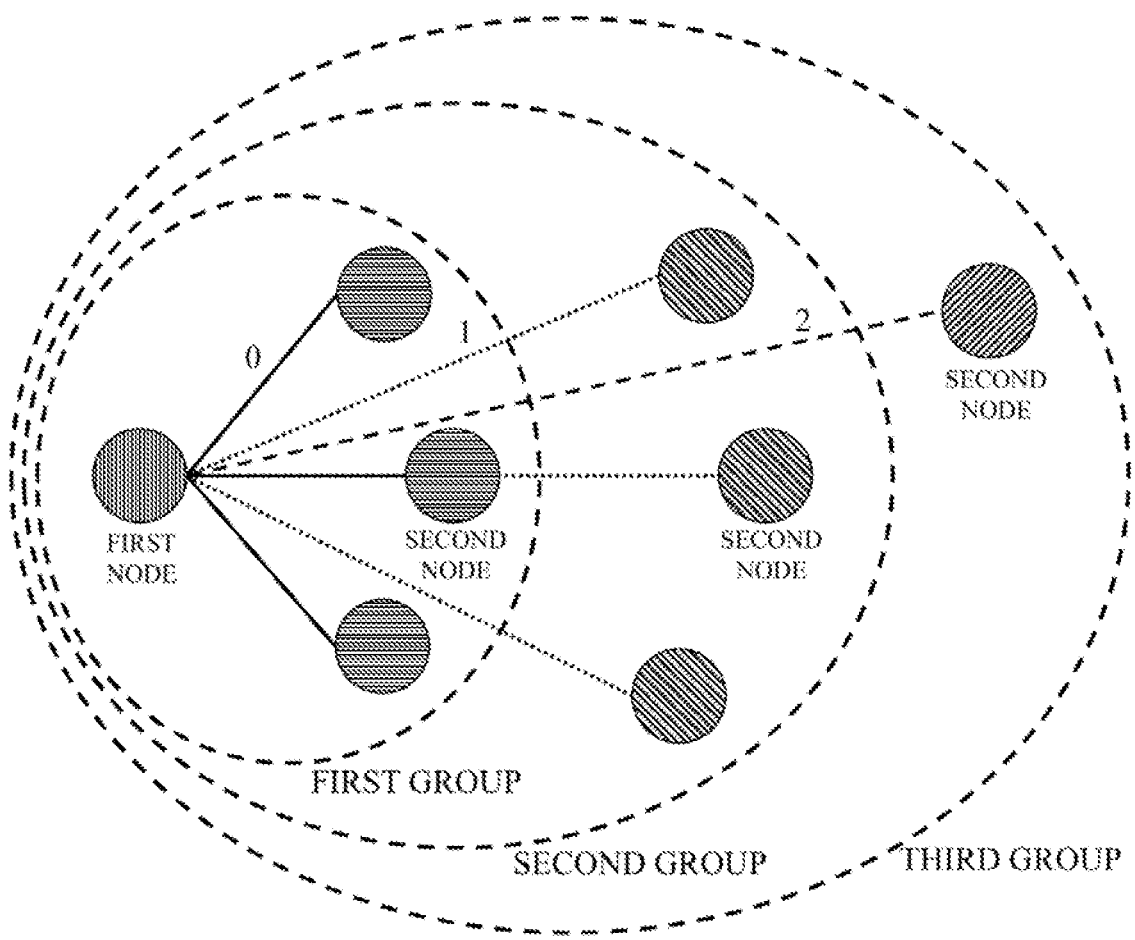
FIG. 3 is a view showing an example of an identity map according to an embodiment of the present invention.

An example of the identity map generated through the above steps will be described with reference to FIG. 3.

The electronic device may determine the risk level of the abnormal transaction through the groups classified for the cluster and provide an event corresponding thereto. A detailed description of the event will be described below with reference to FIG. 3.

Figure 2:
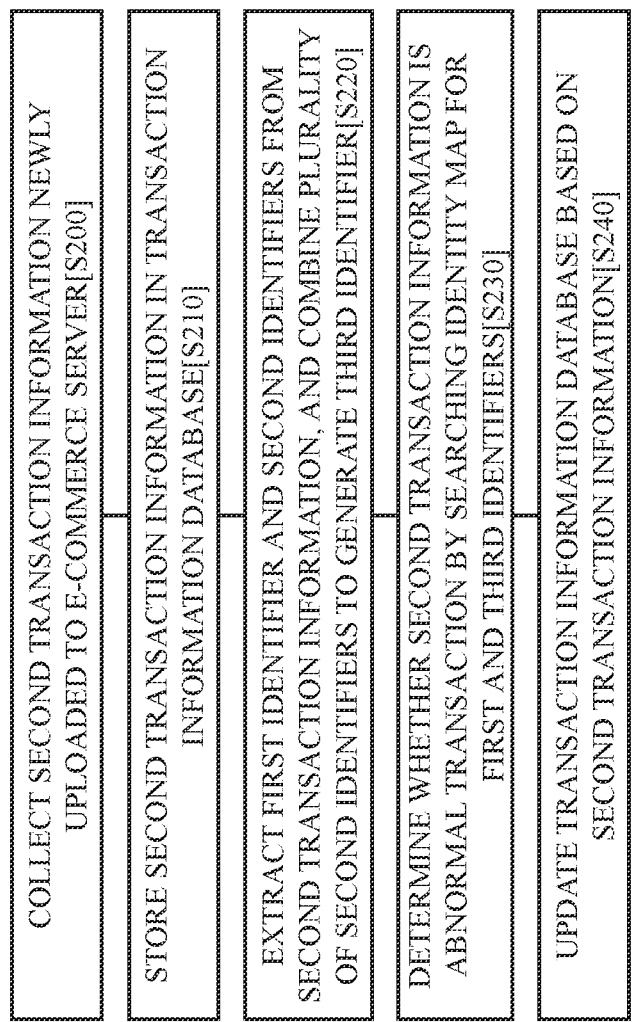
FIG. 2 is a flowchart for describing an abnormal transaction detecting method according to an embodiment of the present invention.

FIG. 2 is a flowchart for describing a method for detecting abnormal transaction according to an embodiment of the present invention. Referring to FIG. 2, an electronic device may detect an abnormal transaction based on the identity map generated through the flowchart of FIG. 1.

In step 200, the electronic device may collect second transaction information newly uploaded to an e-commerce server. The electronic device may comply with a conventional technique in collecting the second transaction information.

The second transaction information may be classified into a status of pre-transaction, in-transaction, or transaction completion. The newly uploaded second transaction information which is in the pre-transaction status will include only second product information and second user information (seller). The second transaction information which is in the in-transaction status may include the second product information, second payment information, second delivery information, and second user information (seller and buyer). When the second payment information, the second delivery information, and the second user information corresponding to the second transaction information in which the transaction has not been performed are additionally received, the electronic device may change the status of the second transaction information to the in-transaction status.

In step 210, the electronic device may store the second transaction information in the transaction information database.

In step 220, the electronic device may extract a first identifier and a second identifier included in the second transaction information, and combine the plurality of second identifiers to generate a third identifier. As described above with reference to FIG. 1, the first identifier is a device ID and payment information, which are unique data that is difficult for a user to arbitrarily modify, the second identifier may be an identifier other than the first identifier, and the third identifier may be a combination of a plurality of second identifiers.

In step 230, the electronic device may search the identity map for the first identifier and the third identifier and determine whether the second transaction information is an abnormal transaction in order to determine whether the second transaction information is generated by an abnormal user.

Since the method for detecting abnormal transaction according to an embodiment of the present invention complexly analyzes the abnormal transaction using various identifiers, it may be difficult for the abnormal user to avoid the abnormal transaction detection.

Hereinafter, a method of determining whether the second transaction information is an abnormal transaction by searching the identity map for the first identifier and the third identifier included in the second transaction information will be described.

1) First Identifier

A first identifier according to an embodiment of the present invention may include a device ID and payment information. When the status of the second transaction information is a pre-transaction status, the first identifier may be a device ID, and when the status of the second transaction information is an in-transaction status or a transaction completion status, the first identifier may include the device ID and payment information of a second user (second seller and second buyer).

When the electronic device searches the identity map for the first identifier and finds a second node corresponding to the first identifier in the identity map, the electronic device may determine whether first transaction information corresponding to the second node includes an abnormal transaction tag based on the color or size of the corresponding second node. When the corresponding second node is related to the abnormal transaction, the electronic device may determine that a user (second seller or second buyer) corresponding to the second transaction information is the abnormal user. In this case, since the second node corresponding to the first identifier belongs to the first group of the identity map, the electronic device may block the second transaction information and the second user determined to be an abnormal user.

Furthermore, when the first identifier includes both the device IDs of the second seller and the second buyer, the electronic device may further identify whether the second nodes corresponding to the second seller and the second buyer are in the same cluster. When it is determined that the second nodes corresponding to the second seller and the second buyer are in the same cluster, the electronic device may determine the second transaction information as a cross-trading and block the second transaction information.

2) Third Identifier

The third identifier according to an embodiment of the present invention is a combination of a plurality of second identifiers, which include delivery information including a delivery address and postal codes, name, contact information, access IP address, and location information, and may be a combination of the second identifiers set by a manager. The fourth identifier means an identifier which is not selected as the third identifier among the second identifiers. Also, the third identifier and the fourth identifier may not include a specific identifier according to the status of the second transaction information.

When the electronic device searches the identity map for a third identifier and finds a second node corresponding to the third identifier in the identity map, the electronic device may determine that there is a high possibility that the second user (second seller or second buyer) corresponding to the second transaction information is an abnormal user. As the second node corresponding to the third identifier belongs to a second group, the electronic device may provide a notification to a user who is not determined to be an abnormal user among a third seller and a third buyer, which are third users, and to a manager terminal.

In addition, when the electronic device searches the identity map for a fourth identifier and finds a second node corresponding to the fourth identifier in the identity map, the electronic device may determine that there is a possibility that the second user (second seller or second buyer) corresponding to the second transaction information is an abnormal user. As the second node corresponding to the fourth identifier belongs to a third group, the electronic device may track the transaction progress of a third user who is likely to be an abnormal user and provide it to the manager terminal so as for the manager to perform monitoring.

For example, when the second transaction information includes second user information on seller "A" and buyer "B", and the electronic device determines that the seller "A" is an abnormal user based on the second user information, the electronic device may provide a notification for risk to the terminal of the buyer "B" of the second users and the manager terminal.

Access IP Address

Meanwhile, the electronic device according to another embodiment of the present invention may further search the transaction information database for a second access IP address included in the second user information. When the access IP address included in the second user information is the same as or uses the same band range as the dangerous IP address stored in the abnormal transaction database, the electronic device may determine that the second transaction information is generated in the IP band mainly used by abnormal users and block the second transaction information.

Dark Web Exposure

Also, the electronic device may access a dark web based on a name, contact information, or the like included in the second user information and determine whether the name or the contact information is exposed to an abnormal user. When the name or the contact information included in the second user information is exposed to the dark web, the electronic device may block the second transaction information.

Product Image Piracy

Meanwhile, the electronic device according to another embodiment of the present invention may identify a feature region in the second product image of the second transaction information and extract a feature descriptor of the second product image. The feature region refers to a feature descriptor for determining whether images are identical or similar, that is, a main region for extracting a feature descriptor, and the feature descriptor may express the features of the second product image as a vector value.

According to an embodiment of the present invention, the feature region is contours included in an image, angles such as corners among the contours, blobs that are distinct from surrounding areas, regions that are invariant or covariant depending on the deformation of the image, or poles with features that are darker or brighter than the surrounding brightness.

The electronic device may calculate the feature descriptor using the position of the feature region for the second product image, or the brightness, color, sharpness, gradient, scale, or pattern information of the feature region. For example, the feature descriptor may be calculated by converting the brightness value, the change value of the brightness, or the distribution value of the feature region into a vector.

The electronic device may determine whether a first product image identical to the second product image is stored in the transaction information database based on the feature descriptor of the second product image.

When the first product image identical to the second product image exists in the product information database, the electronic device may determine the second product image as a stolen image and block the second transaction information.

Returning to the description related to FIG. 2, in step 240, the electronic device may update the transaction information database based on the second transaction information. Specifically, the electronic device may update the transaction information database by adding a tag indicating an abnormal transaction to the second transaction information that is determined to be an abnormal transaction and is blocked.

In step 240, the electronic device may update the identity map based on the second transaction information. Specifically, the electronic device may further expand the identity map by generating and connecting second nodes corresponding to the first identifier and the third identifier of the second transaction information to the first node for the second user of the second transaction information.

Figure 4:
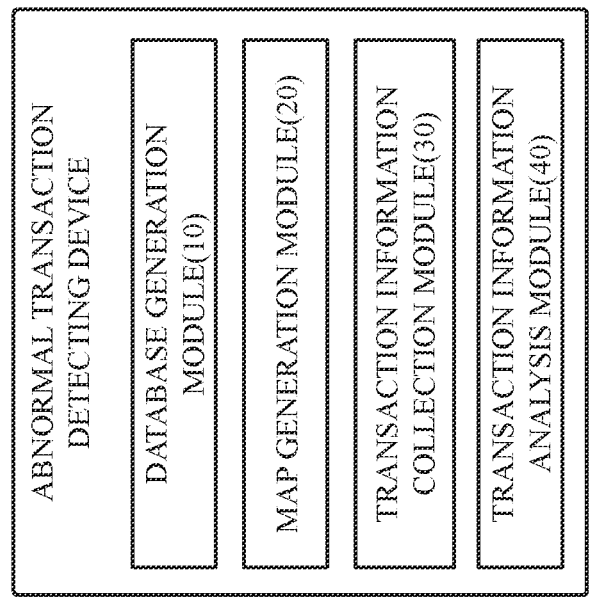
FIG. 4 is a diagram illustrating a configuration of an apparatus for detecting abnormal transactions according to an embodiment of the present invention.

FIG. 4 is a configuration diagram for describing an abnormal transaction detecting device according to an embodiment of the present invention. Hereinafter, an abnormal transaction detecting device will be described with reference to FIG. 4. Before describing the abnormal transaction detecting device, it should be noted that a detailed embodiment overlapping with the above-described method for detecting abnormal transaction may be omitted. Specifically, the abnormal transaction detecting device may include a database generation module 10, a map generation module 20, a transaction information collection module 30, and a transaction information analysis module 40.

The database generation module 10 may collect a plurality of pieces of first transaction information pre-stored in an e-commerce server. The database generation module 10 may build a transaction information database based on the first transaction information. In building the transaction information database, the electronic device may crawl a website for a first product image included in the first transaction information to further collect images related to the first product corresponding to the first transaction information. The electronic device may build the transaction information database by further including the collected image related to the first product as the first product image.

In addition, the database generation module 10 may further store, in the transaction information database, dangerous IP information on IP addresses reported or blocked as fraudulent by users of electronic commerce transactions. The electronic device may collect additional information such as the IP owner organization, country, allocated band range (Classless Inter-Domain Routing: CIDR), or the like of the reported IP address and further include the additional information in the dangerous IP information.

The map generation module 20 may extract at least one first identifier from the first transaction information stored in the transaction information database. The first identifier may be a device ID and payment information, which are unique data that is difficult for a user to arbitrarily change.

The map generation module 20 may extract second identifiers other than the first identifier from the first transaction information, and combine the plurality of second identifiers to generate a third identifier. The second identifier is information that a user is able to arbitrarily modify at any time. Since it is difficult to determine an abnormal user with the second identifier alone, it is possible to generate a third identifier by combining a plurality of second identifiers, thereby enabling the third identifier to be used as a basis enough to determine an abnormal user Meanwhile, the map generation module 20 may further set what is not defined as the third identifier among the second identifiers as a fourth identifier.

The map generation module 20 may normalize first address information before the first address information included in the first transaction information is used as the second identifier. Since the consistency of the address information is deteriorated because either one of a road name address and a land-lot address is used depending on the user, the map generation module 20 may convert the land-lot address into the road name address when the address information represents the land-lot address. In addition, the map generation module 20 may remove unnecessary characters, symbols, and blanks included in a detailed address and unify the format of the detailed address through a hyphen.

The map generation module 20 may generate a first node corresponding to the unique identification information of a first user included in the first transaction information.

The map generation module 20 may generate a second node based on a first identifier extracted from the first transaction information and/or a third identifier. The first node and the second node will be connected as an edge. In this way, the identity map will be configured by centering a node for the user's unique identification information.

The map generation module 20 may generate an identity map using the first node and the second node. When the identical second node is connected to another first node, the map generation module 20 may connect the nodes like the first node (a)—the second node—the first node (b). In this case, the map generation module 20 may determine that the same user has used different unique identification information, based on the first node (a) and the first node (b).

When generating the identity map, the map generation module 20 may set an edge distance between the first node and the second node. The map generation module 20 may set the edge distance between the first node and the second node corresponding to the first identifier to 0. Accordingly, when there are a plurality of first nodes connected to the second node, the edge distance between the plurality of first nodes will be 0.

In addition, the map generation module 20 may use a set value of a manager for the third identifier when setting the edge distance between the first node and the second node corresponding to the third identifier. The map generation module 20 may set the edge distance between the second node corresponding to the third identifier and the first node to 1, and set the edge distance between the second node corresponding to the fourth identifier and the first node to 2.

The map generation module 20 may set all first and second nodes connected in the identity map as one cluster. Accordingly, the identity map may include at least one cluster, and first nodes belonging to one cluster may be estimated to be the same user.

The map generation module 20 may classify one cluster into at least one group. More specifically, the map generation module 20 may set a set of a first node and a second node corresponding to a first identifier, which belong to a cluster, as a first group, set a set of the first node and a second node corresponding to a third identifier as a second group, and set a set of the first node and a second node corresponding to a fourth identifier as a third group.

That is, the map generation module 20 may set the second node having an edge distance of 0 from the first node to a first group, the second node having an edge distance of 1 from the first node to a second group, and the second node having an edge distance of 2 from the first node to a third group.

The map generation module 20 may determine the risk level of an abnormal transaction through a group classified for a cluster and provide an event such as blocking or tracking corresponding thereto.

The transaction information collection module 30 may collect second transaction information newly uploaded to an e-commerce server and store the second product information in the transaction information database. The transaction information collection module 30 may comply with a conventional technique in collecting the second transaction information.

The second transaction information may be classified into a status of pre-transaction, in-transaction, or transaction completion. The newly uploaded second transaction information which is in the pre-transaction status will include only second product information and second user information (seller). The second transaction information which is in the in-transaction status may include the second product information, second payment information, second delivery information, and second user information (seller and buyer). When the second payment information, the second delivery information, and the second user information corresponding to the second transaction information in which the transaction has not been performed are additionally received, the transaction information collection module 30 may change the status of the second transaction information to the in-transaction status.

The transaction information collection module 30 may store the second transaction information in the transaction information database.

The transaction information analysis module 40 may extract a first identifier and a third identifier included in the second transaction information. The first identifier is a device ID and payment information, which are unique data that is difficult for a user to arbitrarily modify, the second identifier may be an identifier other than the first identifier, and the third identifier may be a combination of a plurality of second identifiers.

The transaction information analysis module 40 may search the identity map for the first identifier and the third identifier and determine whether the second transaction information is an abnormal transaction in order to determine whether the second transaction information is generated by an abnormal user.

1) First Identifier

A first identifier according to an embodiment of the present invention may include a device ID and payment information. When the status of the second transaction information is a pre-transaction status, the first identifier may be a device ID, and when the status of the second transaction information is an in-transaction status or a transaction completion status, the first identifier may include the device ID and payment information of a second user (second seller and second buyer).

When the transaction information analysis module 40 searches the identity map for the first identifier and finds a second node corresponding to the first identifier in the identity map, the transaction information analysis module 40 may determine whether first transaction information corresponding to the second node includes an abnormal transaction tag based on the color or size of the second node. When the corresponding second node is related to the abnormal transaction, the electronic device may determine that a user (second seller or second buyer) corresponding to the second transaction information is the abnormal user. In this case, since the second node corresponding to the first identifier belongs to the first group of the identity map, the electronic device may block the second transaction information and the second user determined to be an abnormal user.

2) Third Identifier

The third identifier according to an embodiment of the present invention is a combination of a plurality of second identifiers, which include a product image, a text including product introduction and user-to-user conversations, delivery information including a delivery address and postal codes, name, contact information, access IP address, and location information, and may be a combination of the second identifiers set by a manager. The fourth identifier means an identifier which is not selected as the third identifier among the second identifiers. Also, the third identifier and the fourth identifier may not include a specific identifier according to the status of the second transaction information.

When the transaction information analysis module 40 searches the identity map for the third identifier and finds a second node corresponding to the third identifier in the identity map, the transaction information analysis module 40 may determine that there is a high possibility that the second user (second seller or second buyer) corresponding to the second transaction information is an abnormal user. As the second node corresponding to the third identifier belongs to a second group, the transaction information analysis module 40 may provide a notification to a user who is not determined to be an abnormal user among a second seller and a second buyer, which are second users, and to a manager terminal.

In addition, when the transaction information analysis module 40 searches the identity map for the fourth identifier and finds a second node corresponding to the fourth identifier in the identity map, the transaction information analysis module 40 may determine that there is a possibility that the second user (second seller or second buyer) corresponding to the second transaction information is an abnormal user. As the second node corresponding to the fourth identifier belongs to a third group, the electronic device may track the transaction progress of a second user who is likely to be an abnormal user and provide it to the manager terminal so as for the manager to perform monitoring.

Meanwhile, the transaction information analysis module 40 may further search the transaction information database for a second access IP address included in the second user information. When the access IP address included in the second user information is the same as or uses the same band range as the dangerous IP address stored in the abnormal transaction database, the transaction information analysis module 40 may determine that the second transaction information is generated in the IP band mainly used by abnormal users and block the second transaction information.

Furthermore, the transaction information analysis module 40 may access a dark web based on a name, contact information, or the like included in the second user information and determine whether the name or the contact information is exposed to an abnormal user. When the name or the contact information included in the second user information is exposed to the dark web, the transaction information analysis module 40 may block the second transaction information.

Meanwhile, the transaction information analysis module 40 may detect a feature region of the second product image included in the second transaction information. The transaction information analysis module 40 may extract a feature descriptor of the second product image.

The transaction information analysis module 40 may calculate the feature descriptor using the position of the feature region for the second product image, or the brightness, color, sharpness, gradient, scale, or pattern information of the feature region. For example, the feature descriptor may be calculated by converting the brightness value, the change value of the brightness, or the distribution value of the feature region into a vector.

The transaction information analysis module 40 may determine whether the first product image identical to the second product image is stored in the transaction information database based on the feature descriptor of the second product image.

When the first product image identical to the second product image exists in the transaction information database, the transaction information analysis module 40 may determine the second product image as a stolen image and block the second transaction information.

The transaction information analysis module 40 may update the transaction information database based on the second transaction information. Specifically, the transaction information analysis module 40 may update the transaction information database by adding a tag indicating an abnormal transaction to the second transaction information that is determined to be an abnormal transaction and is blocked.

The transaction information analysis module 40 may update the identity map based on the second transaction information. Specifically, the electronic device may further expand the identity map by generating and connecting second nodes corresponding to the first identifier and the third identifier of the second transaction information to the first node for the second user of the second transaction information.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

According to the present invention as described above, it is possible to track abnormal transactions by generating and analyzing an identity graph based on information on transactions already performed in the e-commerce platform. In addition, according to the present invention, it is possible to prevent occurrence of abnormal transactions by grouping abnormal users who have performed abnormal transactions through the identity graph and monitoring abnormal users.

While the present invention has been described with respect to the specific embodiments, it will be apparent to those skilled in the art that various changes and modifications may be made without departing from the spirit and scope of the invention as defined in the following claims.

What is claimed is:

1. A method for detecting an abnormal transaction in an electronic device, the method comprising:
   building a transaction information database of an e-commerce server by collecting first transaction information stored in the e-commerce server, the first transaction information including information of a first product;
   generating an identity map based on the first transaction information stored in the transaction information database of the e-commerce server, wherein the generating of the identity map includes extracting a first identifier from the first transaction information, extracting a plurality of second identifiers other than the first identifier from the first transaction information, generating a third identifier by combining the plurality of second identifiers, and generating the identity map including the first identifier and the third identifier, and the first identifier includes one of a first device ID and first payment information, and the plurality of second identifiers include a first postal code, first address information, first contact information, first name or first access IP information, and the third identifier is generated by combining the first access IP information and at least one among the first postal code, the first address information, the first contact information or the first name;
   collecting second transaction information newly uploaded to the e-commerce server, the second transaction information including an image of a second product;
   extracting a first identifier of a user and a plurality of second identifiers of the user from the second transaction information and generating a third identifier of the user by combining the plurality of second identifiers of the user extracted from the second transaction information, wherein the first identifier of the user extracted from the second transaction information includes one of a second device ID and second payment information, and the plurality of second identifiers of the user extracted from the second transaction information include a second postal code, second address information, second contact information, second name or second access IP information, and the third identifier of the user is generated by combining the second access IP information and at least one among the second postal code, the second address information, the second contact information or the second name;
   determining whether the second transaction information is an abnormal transaction by searching the first identifier of the user and the third identifier of the user in the identity map;
   blocking the second transaction information and updating the transaction information database based on the second transaction information being determined to be the abnormal transaction, and
   wherein the generating of the identity map comprises:
   (i) generating a first node corresponding to unique identification information of a first user included in the first transaction information,
   (ii) generating a second node corresponding to the first identifier extracted from the first transaction information,
   (iii) generating a second node corresponding to the third identifier generated by combining the plurality of second identifiers extracted from the first transaction information, and
   (iv) generating the identity map by connecting the first node and the second node corresponding to the first identifier, and the first node and the second node corresponding to the third identifier with edges of different lengths,
   wherein the method further comprises:
   differentiating a node including an abnormal transaction tag for the first transaction information from a node not including the abnormal transaction tag for the first transaction information,
   wherein the differentiating of the node including the abnormal transaction tag comprises:
   changing a size of the node including the abnormal transaction tag,
   wherein the determining of whether the second transaction information is the abnormal transaction comprises:
   (i) based on a second node corresponding to the first identifier of the user being found in the identity map and a second node corresponding to the third identifier of the user being found in the identity map, determining whether transaction information corresponding to the found second node includes the abnormal transaction tag based on a size of the found second node, and
   (ii) based on the found second node having the changed size, determining that the transaction information corresponding to the found second node includes the abnormal transaction tag, and the second transaction information is the abnormal transaction,
   wherein the method further comprises:
   (i) configuring all of the first node and the second nodes as one cluster,
   (ii) classifying the one cluster into a first group and a second group by setting a set of the first node and the second node corresponding to the first identifier as the first group and setting a set of the first node and the second node corresponding to the third identifier as the second group, and
   (iii) determining a risk level of the abnormal transaction through the classified first and second groups and providing an event corresponding to the determined risk level,
   wherein the building of the transaction information database comprises:
   crawling, by the electronic device, a website for an image of the first product of which information is included in the first transaction information,
   collecting, by the electronic device, the image of the first product based on the crawling, and
   building, by the electronic device, the transaction information database by including the collected image of the first product in the transaction information database,
   wherein the method further comprises:
   identifying, by the electronic device, a feature region in the image of the second product included in the second transaction information,
   obtaining, by the electronic device, a feature descriptor of the image of the second product by using the feature region in the image of the second product,
   determining, by the electronic device, whether the image of the first product is identical to the image of the second product based on the feature descriptor, and
   determining, by the electronic device, the image of the second product as a stolen image based on the image of the first product being identical to the image of the second image.

2. The method of claim 1,
wherein the first transaction information further includes a tag according to presence or absence of an abnormal transaction.
3. The method of claim 1,
wherein the first payment information includes first account information or first card information.
4. The method of claim 1, further comprising:
converting the first address information into a road name address, removing unnecessary characters, symbols, and blanks from a detailed address of the road name address, and unifying a detailed address format using hyphens.
5. The method of claim 1, further comprising:
further setting an identifier that is not defined as the third identifier among identifiers of the first transaction information as a fourth identifier.
6. The method of claim 5,
wherein the generating of the identity map includes setting an edge distance between the first node and the second node corresponding to the first identifier to 0, an edge distance between the first node and the second node corresponding to the third identifier to 1, and an edge distance between the first node and the second node corresponding to the fourth identifier to 2.
7. The method of claim 6, further comprising:
setting all nodes connected as edges among the first and second nodes included in the identity map as a first cluster; and
classifying the first cluster into at least one group and processing the second transaction information.
8. The method of claim 7, further comprising:
setting a second node of which an edge distance with the first node is 0 as a first group;
setting a second node of which an edge distance with the first node is 1 as a second group; and
setting a third node of which an edge distance with the first node is 2 as a third group.
9. The method of claim 8,
wherein the blocking of the second transaction information includes blocking, monitoring or tracking second transaction information based on the edge distance with the first node when there is a second node corresponding to the first identifier or the third identifier in the identity map.
10. The method of claim 9, further comprising:
blocking the second transaction information when the edge distance is 0;
providing a notification to a manager terminal when the edge distance is 1; and
tracking the second transaction information and providing the second transaction information to the manager terminal when the edge distance is 2.
11. An abnormal transaction detecting device comprising:
a processor; and
a memory storing instructions executable by the processor,
wherein the processor is configured to:
build a transaction information database of an e-commerce server by collecting first transaction information stored in the e-commerce server, the first transaction information including information of a first product,
generate an identity map based on the first transaction information stored in the transaction information database of the e-commerce server, wherein the processor is configured to extract a first identifier from the first transaction information, extract a plurality of second identifiers other than the first identifier from the first transaction information, generate a third identifier by combining the plurality of second identifiers, and generate the identity map based on the first identifier and the third identifier, and the first identifier includes one of a first device ID and first payment information, and the plurality of second identifiers include a first postal code, first address information, first contact information, first name or first access IP information, and the third identifier is generated by combining the first access IP information and at least one among the first postal code, the first address information, the first contact information or the first name,
collect second transaction information newly uploaded to the e-commerce server, the second transaction information including an image of a second product,
extract a first identifier of a user and a plurality of second identifiers of the user from the second transaction information, generate a third identifier of the user by combining the plurality of second identifiers of the user extracted from the second transaction information, the first identifier of the user extracted from the second transaction information including one of a second device ID and second payment information, and the plurality of second identifiers of the user extracted from the second transaction information including a second postal code, second address information, second contact information, second name or second access IP information, and the third identifier of the user being generated by combining the second access IP information and at least one among the second postal code, the second address information, the second contact information or the second name,
determine whether the second transaction information is an abnormal transaction by searching for the first identifier of the user and the third identifier of the user in the identity map, and
block the second transaction information and update the transaction information database based on the second transaction information being determined to be the abnormal transaction,
wherein the processor is further configured to:
(i) generate a first node corresponding to unique identification information of a first user included in the first transaction information,
(ii) generate a second node corresponding to the first identifier extracted from the first transaction information,
(iii) generate a second node corresponding to the third identifier generated by combining the plurality of second identifiers extracted from the first transaction information, and
(iv) generate the identity map by connecting the first node and the second node corresponding to the first identifier, and the first node and the second node corresponding to the third identifier with edges of different lengths,
wherein the processor is further configured to:
differentiate a node including an abnormal transaction tag for the first transaction information from a node not including the abnormal transaction tag for the first transaction information, wherein the differentiating of the node including the abnormal transaction tag comprises:
changing a size of the node including the abnormal transaction tag,
wherein the determining of whether the second transaction information is the abnormal transaction comprises:
(i) based on a second node corresponding to the first identifier of the user being found in the identity map and a second node corresponding to the third identifier of the user being found in the identity map, determine whether transaction information corresponding to the found second node includes the abnormal transaction tag based on a size of the found second node, and
(ii) based on the found second node having the changed size, determine that the transaction information corresponding to the found second node includes the abnormal transaction tag, and the second transaction information is the abnormal transaction,
wherein the processor is further configured to:
(i) configure all of the first node and the second nodes as one cluster,
(ii) classify the one cluster into a first group and a second group by setting a set of the first node and the second node corresponding to the first identifier as the first group and setting a set of the first node and the second node corresponding to the third identifier as the second group, and
(iii) determine a risk level of the abnormal transaction through the classified first and second groups and provide an event corresponding to the determined risk level,
wherein the processor is further configured to:
crawl a website for an image of the first product of which information is included in the first transaction information,
collect the image of the first product based on the crawling, and
build the transaction information database by including the collected image of the first product in the transaction information database,
wherein the processor is further configured to:
identify a feature region in the image of the second product included in the second transaction information,
obtain a feature descriptor of the image of the second product by using the feature region in the image of the second product,
determine whether the image of the first product is identical to the image of the second product based on the feature descriptor, and
determine the image of the second product as a stolen image based on the image of the first product being identical to the image of the second image.

* * * * *